No. 731,556. PATENTED JUNE 23, 1903.
J. EUTSLER.
HAY PRESS.
APPLICATION FILED OCT. 24, 1902.
NO MODEL. 4 SHEETS—SHEET 1.
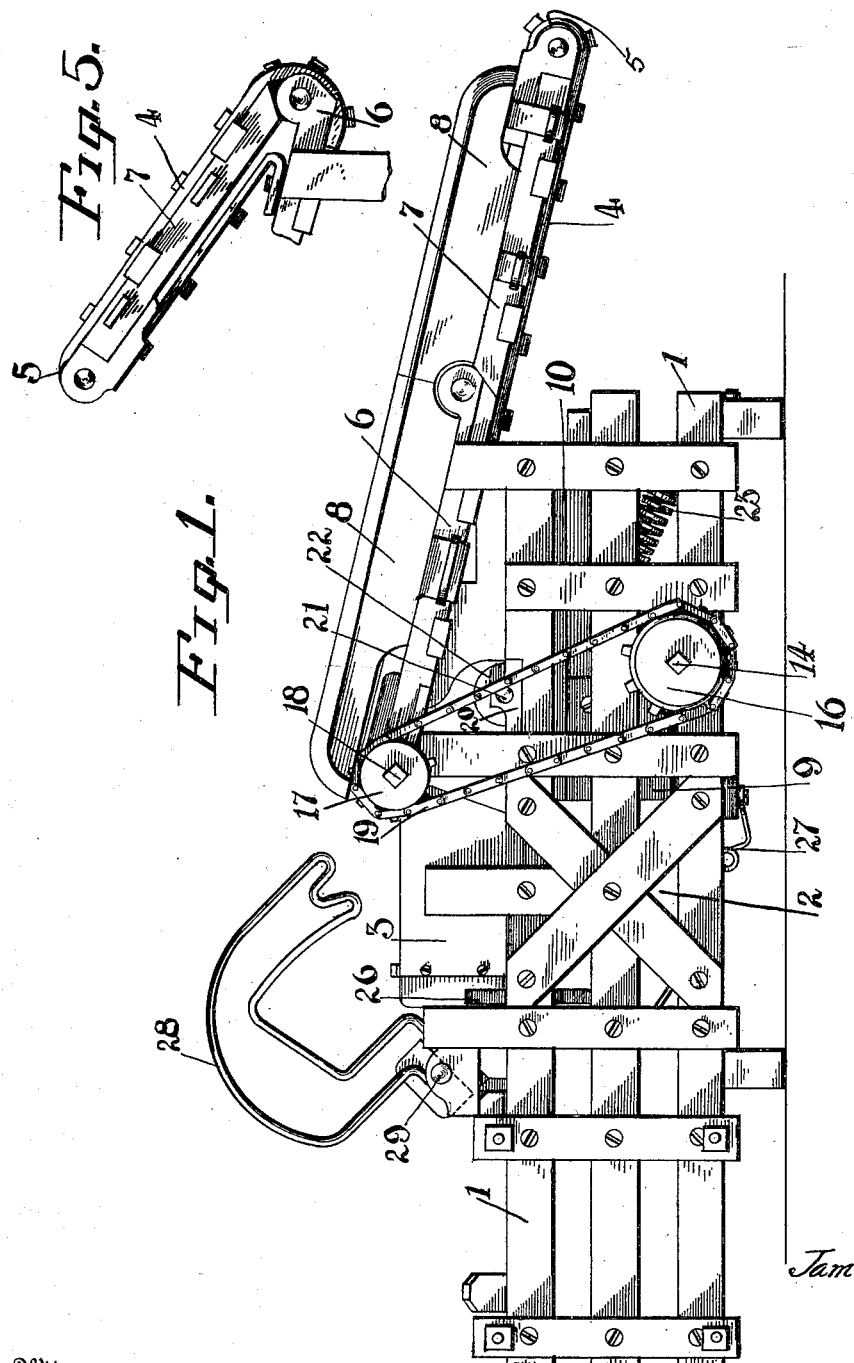
James Eutsler, Inventor
Witnesses

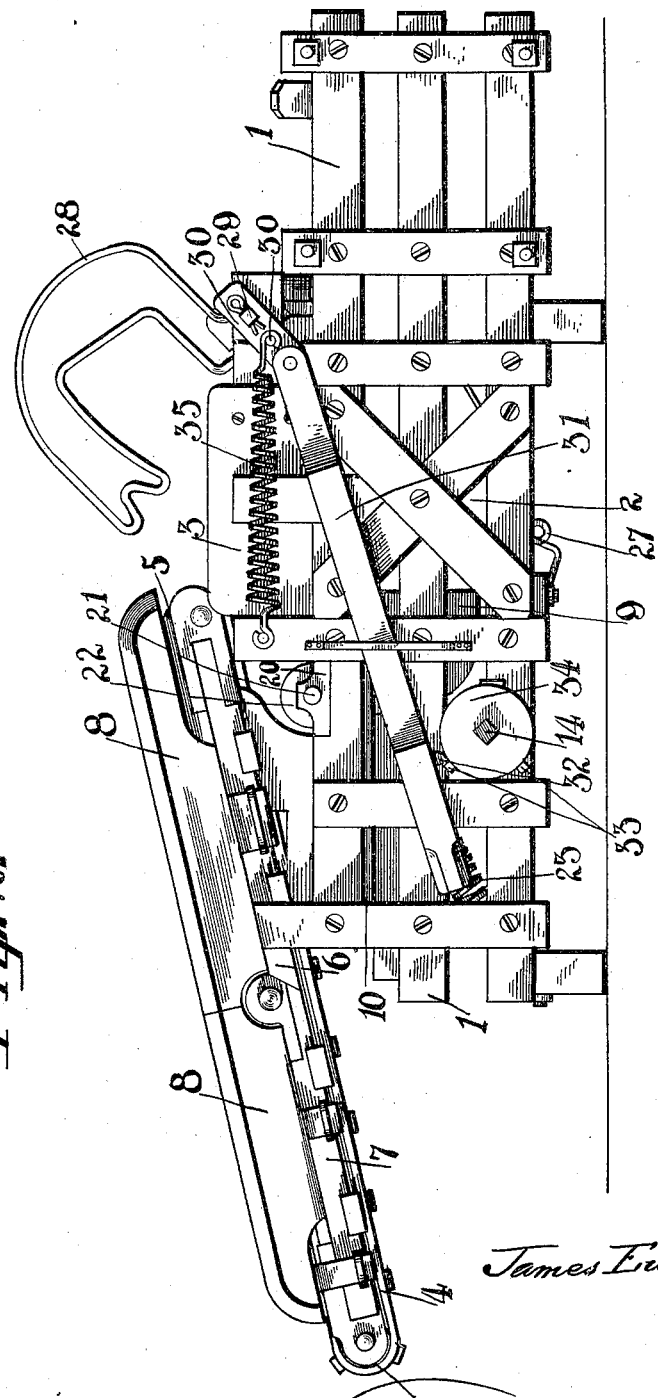

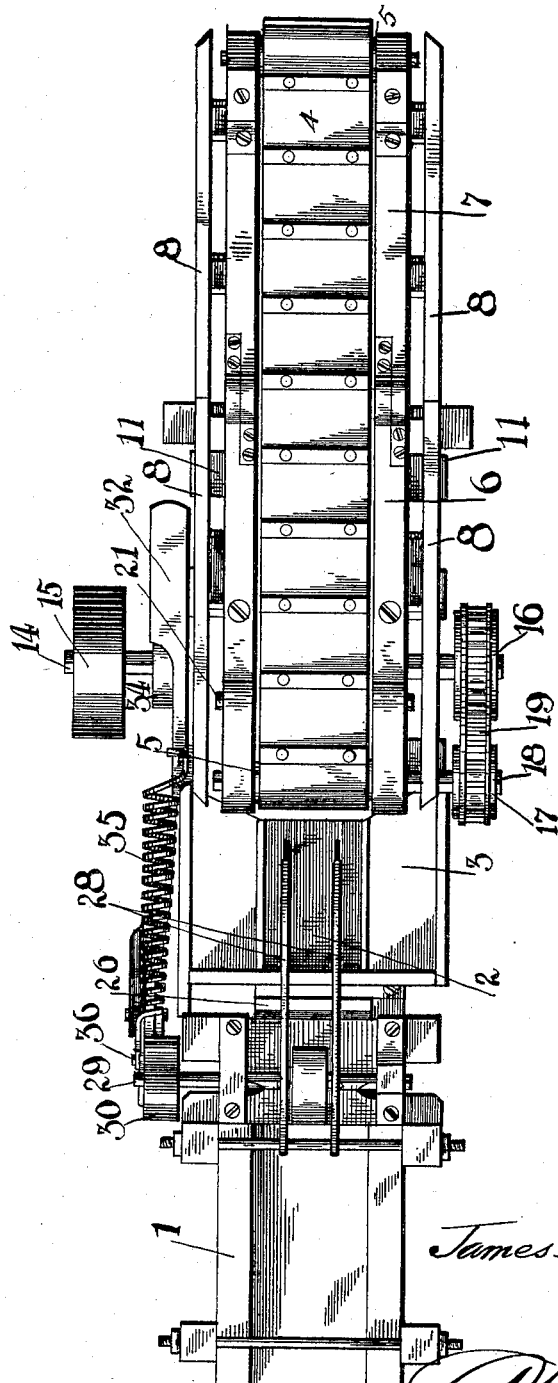

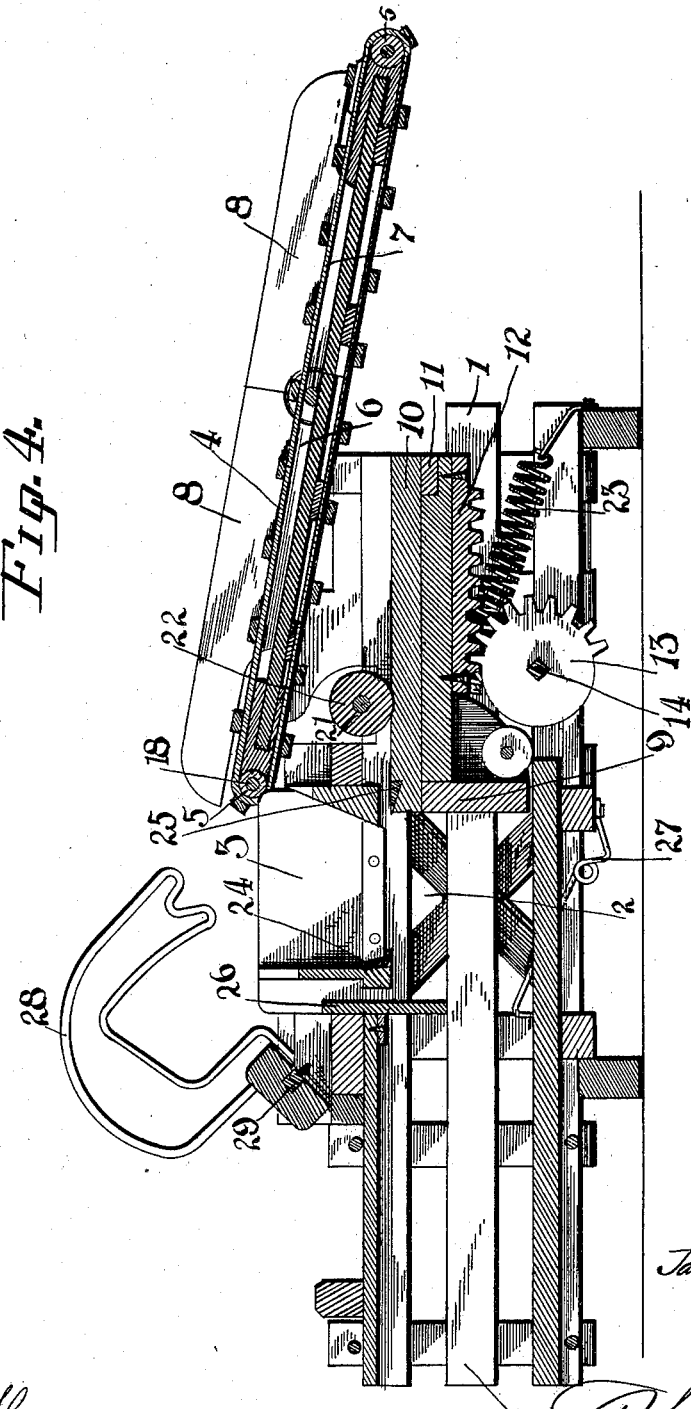

No. 731,556.

Patented June 23, 1903.

UNITED STATES PATENT OFFICE.

JAMES EUTSLER, OF OZARK, MISSOURI.

HAY-PRESS.

SPECIFICATION forming part of Letters Patent No. 731,556, dated June 23, 1903.

Application filed October 24, 1902. Serial No. 128,532. (No model.)

*To all whom it may concern:*

Be it known that I, JAMES EUTSLER, a citizen of the United States, residing at Ozark, in the county of Christian and State of Missouri, have invented certain new and useful Improvements in Hay-Presses, of which the following is a specification.

My invention relates to improvements in hay-presses; and one object of my invention is the provision of a hay or baling press which will convey or carry the hay to the press-box, which will deliver it into the box, form the hay into bales, and cut or trim the end of the bale in one continuous operation.

Another object of my invention is the provision of a hay or baling press which will be of comparatively simple, inexpensive, and durable construction and which will perform its functions in an efficient and practical manner.

With these objects in view my invention consists of a hay or baling press embodying novel features of construction and combination of parts, substantially as disclosed herein.

In order that the construction and operation of my press may be fully understood and its numerous advantages fully appreciated, I have illustrated in the accompanying drawings a hay or baling press embodying my invention.

Figure 1 represents a side view of my hay or baling press. Fig. 2 represents a similar view taken from the opposite side of my press. Fig. 3 represents a top plan view of my press. Fig. 4 represents a central longitudinal sectional view of my invention. Fig. 5 represents a detail view of the conveyer.

Referring by numerals to the drawings, in which similar numerals denote corresponding parts in the several views, the numeral 1 designates the frame of my press, which is composed of sections of wood secured together and arranged to form the longitudinally-disposed press-box 2, with which on the upper side communicates the hopper 3, and leading to said hopper is the conveyer or endless carrier 4, which travels over rollers 5, mounted in each end of the frame, composed of the rigid section 6 and the hinged section 7, and to each side of said section are attached the guide-boards 8. From this construction it will be seen that the hay or material to be baled is placed upon the endless belt or carrier and is thereby conveyed directly to the hopper, which deposits the material into the press-box, and the conveyer can be folded to occupy a small amount of space to facilitate transportation and storing of the press.

Arranged within the press-box is the follower or plunger 9, which has secured to its upper side the strip 10, which is formed with the guides or extensions 11, which move in the frame of the press, and carried by the plunger or follower is the longitudinal rack 12, which is adapted to be engaged by the half gear-wheel 13, mounted on the transverse shaft 14, which carries at one end the driving-wheel 15, which is operated from a suitable source of power, and at the other end carries the sprocket-wheel 16, over which and the sprocket-wheel 17 on the shaft 18, which operates the endless conveyer, passes the sprocket-chain 19. Also passing through the frame and mounted in bearings 20 is the shaft 21, which carries a guide-roll 22, which rests upon the top of the plunger and serves to cause the plunger to run evenly and smoothly in the press-box, and to the plunger is connected the inner end of a spring 23, the other end being connected to the frame of the machine, the purpose of said spring being to return the plunger to normal position after a bale has been pressed. From this construction it will be seen that the hay or material is carried and deposited in the hopper, where it is pressed by the plunger, and when the plunger has reached its limit or when the half gear-wheel is free of the rack on the plunger the spring will return the plunger for the next operation, and I provide the hopper with a vertical knife or cutter 24, which coacts with a horizontal knife 25 on the plunger to cut or trim the hay at the end of the bale, which gives a smooth and even appearance to the bale and also prevents clogging of the press-box, and I further provide the bale-guiding plate or strip or platen 26, which is retained until the bale has been properly pressed by the spring-holding devices 27.

The means for forcing the hay or material into the press-box consists of the pair of arms 28, mounted on the rock-shaft 29, to one end of which is connected a lever or crank 30, to the lower end of which is connected the upper end of the pitman 31, which is formed with a depending lug 32, which is engaged by the lugs 33 on the wheel 34, mounted on the driving-shaft, and the rock-shaft is provided with the returning-spring 35, which has one end connected to the frame and the other end connected at 36 to the lever or crank on the rock-shaft. From this construction it will be seen that the pitman by its own weight always assumes a downward position, and as the wheel revolves which carries the lug said lug engages the lug on the pitman, which moves said pitman and imparts a rocking motion to the shaft, and consequently causes the arm carried by the rock-shaft to constantly force the hay or material into the press-box, the spring acting to return the pitman to normal position ready for the next operation.

From the foregoing description, taken in connection with the drawings, the operation of my hay or baling press will be readily understood, and it will be observed that my press conveys the hay or material to the press-box, forces it into place, cuts the doubled or uneven edges of the hay, and effects the baling or pressing in a continuous operation and in a rapid and perfect manner. It will also be observed that my press is compact and will occupy a small amount of space, insuring ready storing and transportation, also that the construction is simple and will withstand hard usage, and that the press is thoroughly efficient and practical in every particular.

I claim—

1. A hay or baling press, consisting of the press-box, a hopper communicating therewith, an endless-belt conveyer leading to said hopper, a plunger in the press-box, a force-feeding mechanism consisting of a pair of arms, a rock-shaft carrying said arms, a pitman for rocking said shaft, and a disk having pins to move said pitman, and means for operating said conveyer-plunger and feeding mechanism.

2. A hay or baling press consisting of a press-box, a hopper communicating therewith an endless-belt conveyer leading to the hopper a feeding device for forcing the material into the hopper and press-box consisting of a forcing device, a rock-shaft on which said device is mounted, a pitman for rocking said shaft, a spring for returning the shaft, a disk for operating said pitman, a plunger arranged in the press-box and a cutting mechanism carried by the plunger and hopper.

3. A hay or baling press consisting of the press-box, a plunger arranged therein, a hopper leading to the press-box, an endless conveyer for delivering the material to the hopper, a rack carried by said plunger a driving-shaft having a half-gear engaging said rack to operate the plunger and means for returning the plunger to normal position, the force-feeding device, consisting of a rock-shaft carrying a forcing device, a pitman operating the rock-shaft, a spring for returning said shaft and a disk having pins to engage the pitman to move the pitman to rock the shaft.

4. A hay or baling press consisting of a press-box, a plunger arranged therein, a hopper leading to the press-box, an endless conveyer for delivering the material to the hopper, a cutter for cutting the ends of the hay, and means for operating the plunger, the force-feeding device, consisting of a rock-shaft carrying a forcing device, a pitman operating the rock-shaft, a spring for returning said shaft and a disk having pins to engage the pitman to move the pitman to rock the shaft.

5. A hay or baling press consisting of a press-box, a hopper communicating therewith, an endless carrier for conveying the material to the hopper, a plunger in said press-box, a rocking force-feeding device for forcing the material into the press-box, means for cutting the edges of the material and means for operating the carrier, plunger and force-feed device, the force-feeding device, consisting of a rock-shaft carrying a forcing device, a pitman operating the rock-shaft, a spring for returning said shaft and a disk having pins to engage the pitman to move the pitman to rock the shaft.

6. A hay or baling press, consisting of the press-box, an endless carrier composed of hinged sections for conveying the material to the press-box, a plunger, a spring for returning the plunger and means for simultaneously operating the carrier and plunger, the force-feeding device, consisting of a rock-shaft carrying a forcing device, a pitman operating the rock-shaft, a spring for returning said shaft and a disk having pins to engage the pitman to move the pitman to rock the shaft.

7. A hay or baling press, consisting of a press-box, a press-box communicating therewith, a plunger in said hopper, a cutting mechanism on the plunger and hopper, a conveyer leading to one side of the hopper for depositing the material into the hopper, a force-feeding mechanism arranged on the other side of the hopper for forcing the material into the hopper and mechanism for operating the conveyer, plunger, cutting and feed mechanism, the force-feeding device, consisting of a rock-shaft carrying a forcing device, a pitman operating the rock-shaft, a spring for returning said shaft and a disk having pins to engage the pitman to move the pitman to rock the shaft.

In testimony whereof I affix my signature in presence of two witnesses.

JAMES EUTSLER.

Witnesses:
J. C. WEST,
G. A. PETTIJOHN.